(12) United States Patent
Meuter et al.

(10) Patent No.: US 9,255,573 B2
(45) Date of Patent: Feb. 9, 2016

(54) TESTING APPARATUS FOR AN OUTER HOUSING OF A PUMP AND METHOD FOR THE TESTING OF AN OUTER HOUSING OF A PUMP

(71) Applicant: Sulzer Pumpen AG, Winterthur (CH)

(72) Inventors: Paul Meuter, Seuzach (CH); Thomas Welschinger, Radolfzell (DE); Marcelo Inforsati, Winterthur (BR)

(73) Assignee: SULZER MANAGEMENT AG, Winterthur (CH)

( * ) Notice: Subject to any disclaimer, the term of this patent is extended or adjusted under 35 U.S.C. 154(b) by 228 days.

(21) Appl. No.: 14/097,532

(22) Filed: Dec. 5, 2013

(65) Prior Publication Data
US 2014/0157873 A1   Jun. 12, 2014

(30) Foreign Application Priority Data

Dec. 7, 2012 (EP) .................................... 12196160

(51) Int. Cl.
*G01M 3/02* (2006.01)
*F04B 51/00* (2006.01)
*G01M 3/32* (2006.01)

(52) U.S. Cl.
CPC ................. *F04B 51/00* (2013.01); *G01M 3/02* (2013.01); *G01M 3/025* (2013.01); *G01M 3/32* (2013.01)

(58) Field of Classification Search
CPC ......... G01M 3/02; G01M 3/025; G01M 3/32; F04B 51/00
USPC .................................................... 73/37–49.8
See application file for complete search history.

(56) References Cited

U.S. PATENT DOCUMENTS

| | | | | |
|---|---|---|---|---|
| 2,241,526 A | * | 5/1941 | Rosenkranz | G01M 3/022 138/90 |
| 3,103,235 A | * | 9/1963 | Stringham, III | F16L 55/16455 138/93 |
| 3,436,955 A | * | 4/1969 | Wilcher | G01L 27/00 60/387 |
| 3,618,639 A | * | 11/1971 | Daley | E21B 33/1243 138/93 |

(Continued)

FOREIGN PATENT DOCUMENTS

JP    S5643531 A    4/1981

OTHER PUBLICATIONS

European Search Report mailed May 22, 2013 in Application No. 12196160.1.

*Primary Examiner* — Peter Macchiarolo
*Assistant Examiner* — Alexander Mercado
(74) *Attorney, Agent, or Firm* — Kilpatrick Townsend & Stockton LLP

(57) ABSTRACT

Disclosed is a testing apparatus for an outer housing of a pump, wherein the testing apparatus includes a separation element; a first and a second closure element, wherein the first and second closure element respectively close an axial end of the outer housing in a sealing manner; a middle pressure line which is arranged in the first or the second closure element; and a bounding element, wherein the bounding element closes the outlet outside of the outer housing, and wherein a high pressure line is arranged in the bounding element. The separation element is configured and arranged in the outer housing such that the separation element bounds the outlet of the outer housing and the outer housing is divided into a first pressure region and a second pressure region, wherein the first pressure region and the second pressure region are configured as pressure regions independent from one another.

15 Claims, 2 Drawing Sheets

(56) References Cited

U.S. PATENT DOCUMENTS

Figure 1:
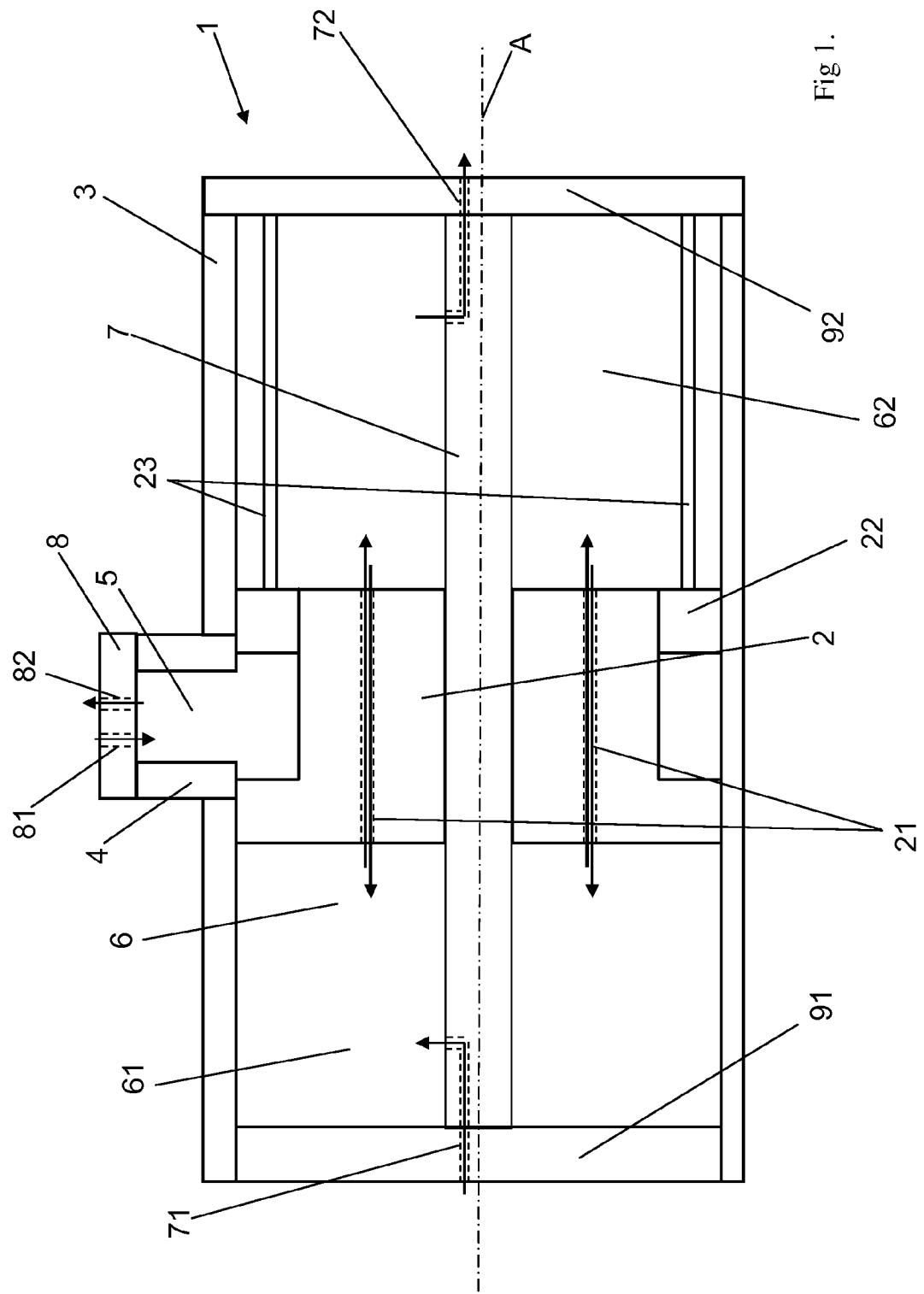

| | | | | |
|---|---|---|---|---|
| 3,750,458 A * | 8/1973 | Messervey | G01M 3/3281 | 73/45.1 |
| 5,205,157 A | 4/1993 | McDaniel | | |
| 5,363,692 A * | 11/1994 | Lafargue | G01N 33/241 | 73/38 |
| 5,569,840 A * | 10/1996 | Thuries | H01B 13/065 | 73/40 |
| 5,698,772 A * | 12/1997 | Deruyter | G01N 15/0826 | 73/152.07 |
| 6,601,437 B2 * | 8/2003 | Gotowik | G01M 3/022 | 138/89 |
| 7,240,697 B2 * | 7/2007 | Beebe | F16L 55/134 | 138/89 |
| 2004/0007050 A1 * | 1/2004 | Stetter | G01M 3/226 | 73/49.2 |
| 2009/0211341 A1 * | 8/2009 | Witt | F04B 51/00 | 73/49.8 |
| 2009/0277249 A1 * | 11/2009 | Polster | G01M 3/229 | 73/40.7 |
| 2013/0276516 A1 * | 10/2013 | Tabor | G01M 99/008 | 73/37 |

* cited by examiner

TESTING APPARATUS FOR AN OUTER HOUSING OF A PUMP AND METHOD FOR THE TESTING OF AN OUTER HOUSING OF A PUMP

This application claims priority European Application No. 12196160.1 filed on Dec. 7, 2012, the disclosure of which in incorporated by reference herein.

The invention relates to a testing apparatus for an outer housing of a pump in accordance with the preamble of the independent claim 1 and to a method for the testing of an outer housing of a pump in accordance with the preamble of the independent claim 11.

Testing apparatuses are, for example, used on the development and testing of pump components. In this respect it is the aim to investigate the functionality of component at operating conditions close to reality, to uncover weak points of a construction already in the run up to a serial manufacture or to investigate possible technical improvements at an existing design with respect to their suitability of use and their durability.

A central test on the development and the construction of pumps is the pressure testing of outer housings of pumps, by means of which the verification of a sufficient strength and leak tightness of the outer housing is brought about. For this purpose, the outer housing is filled with a testing liquid and the pressure is slowly increased up to the level of the testing pressure. The testing pressure then acts for a certain time, during which the pressure is only allowed to fall within a predefined tolerance and the outer housing is not allowed to loose any testing liquid. Subsequently it is tested whether unallowed plastic deformations have arisen or leaks, in particular at weld beads, closures, seals or at connections (flanges, threads, screws etc.) are present.

Typically, the outer housing is tested at 1.5 times the output pressure of the pump during a pressure test, which output pressure corresponds to the highest pressure of the pump, i.e. the high pressure, or the testing pressure is divided into inlet and outlet pressure and the inlet region of the outer housing is, for example, tested at the inlet pressure and an inner space of the outer housing is tested at 1.5 times the output pressure. The reason for this is that one or more pressure chambers pressurized at high pressure, i.e. the simple output pressure, are present within the outer housing. These pressure chambers pressurized at high pressure are accompanied with high technical demands on the outer housing, for example, larger wall thicknesses and diameters of the outer housing are required, whereby the cost of a pump increases.

For this reason, starting from this state of the art, it is an object of the present invention to provide a testing apparatus and a method which enables the testing of an outer housing efficiently and in line with demand.

This object is satisfied by a testing apparatus for an outer housing of a pump in accordance with the invention having the features of claim 1 and by a method for testing the outer housing of a pump having the features of claim 11.

In accordance with the invention a testing apparatus for an outer housing of a pump is suggested, wherein the outer housing has an outlet. The testing apparatus includes a separation element, a first and a second closure element, wherein the first and second closure element respectively close an axial end of the outer housing in a sealing manner, a middle pressure line which is arranged in the first or the second closure elements and a bounding element, wherein the bounding element closes the outlet outside of the outer housing and wherein a high pressure line is arranged in the bounding element. The separation element is configured and arranged in the outer housing such that the separation element bounds the outlet of the outer housing and the outer housing is divided into a first pressure region and a second pressure region, wherein the first and second pressure region are configured as pressure regions independent from one another.

The testing apparatus for an outer housing of a pump, with the outer housing having an outlet, includes a separation element, a first and a second closure element, wherein the first and second closure elements respectively close an axial end of the outer housing in a sealing manner, a middle pressure line which is arranged in a first or a second closure element and a bounding element, wherein the bounding element closes the outlet outside of the outer housing and a high pressure line is arranged in the bounding element.

The outer housing can, for example, be configured as a substantially hollow cylindrical or tubular housing in which the outlet is arranged, for example, as a cylindrical opening in the outer housing. The outer housing can, for example, be closed or opened at both axial ends by means of the first and a second closure element. The first and second closure elements can be cylindrical and configured as one piece, wherein, for example, an inner diameter of the first and/or the second closure element can correspond to an inner diameter of the outer housing. The first and second closure elements can be freely displaced in an axial direction in the outer housing, such that an arbitrary arrangement in the region of the axial ends is possible. The first and second closure elements can, for example, separate the inner region from the outer region of the outer housing and thus define different pressure regions, for example, a low pressure region outside of the outer housing. A respective sealing element can, for example, be arranged between the first and the second closure element and the outer housing, such that the axial ends of the outer housing can be closed in a sealing manner. The middle pressure line can, for example, be arranged as an opening or a bore which, for example, can be closed by means of a closure, in the first and/or the second closure element. The middle pressure line can, however, also be arranged in the first and/or the second closure element and in the shaft. Likewise, one or more or also different middle pressure lines can be provided such that, in the operating state of the testing apparatus, a testing fluid can be supplied via a middle pressure line and can be drawn away via a further middle pressure line.

The bounding element closes the outlet of the outer housing in a sealing manner and is arranged outside of the outer housing. For this purpose, the bounding element can, for example, be screwed to the outer housing or be plugged by means of spigots. The high pressure line can be arranged in the bounding element, for example, as an opening or a bore which can, for example, be closed by means of a closure. Likewise, one or more or also different high pressure lines can be provided such that, in the operating state of the testing apparatus, a testing liquid can be supplied via a high pressure line and can be drawn away via a further high pressure line.

The pump for which the outer housing is used can, for example, include a first and a second part pump which in turn is formed from one or more pump modules and which are arranged in the outer housing. The individual pump modules can, for example, be screwed to one another or, however, simply be joined to one another. The separation element is arranged at a position in the testing apparatus which is present between the first and second part pump in the installation state.

In accordance with the invention the separation element is configured and arranged in the outer housing such that the separation element bounds the outlet of the outer housing and the outer housing is divided into a first pressure region and a second pressure region, wherein the first and second pressure region are configured as pressure regions independent from one another.

The separation element can be configured cylindrical and in one piece, wherein, for example, an outer diameter of the separation element corresponds to an inner diameter of the outer housing. The separation element can, for example, be displaced in an axial direction in the outer housing, such that an arbitrary arrangement within the outer housing is possible. This separation element and the outer housing can, for example, be screwed to one another. However, it is also possible that the separation element is introduced into the outer housing without further fastening elements.

The separation element is arranged at the outlet such that the first pressure region is bounded by the separation element, the bounding element and the outer housing. The first pressure region can, for example, be pressurized with a pressure by means of the high pressure line, which pressure, for example, corresponds to the highest pressure of the testing apparatus in the operating state, this means a high pressure in the overall testing apparatus. The first pressure region is thus configured as a high pressure region. The second pressure region is bounded by the separation element, the outer housing and the first and/or second closure element, wherein no flow connection to the first pressure region exists. The second pressure region can be pressurized by a pressure by means of a middle pressure line, which pressure is, in particular smaller than the pressure in the first pressure region, in particular corresponds to half the pressure, this means it corresponds to a middle pressure of the first pressure region. In the operating state of the testing apparatus, thus a higher pressure is present in the first pressure region than in the second pressure region.

It is advantageous that a check can be made efficiently and in line with demands by means of the testing apparatus. Due to the limiting of the high pressure region to the first pressure region, a testing of the first pressure region with a high pressure and of the second pressure region by means of a middle pressure is possible in contrast to the testing apparatuses known from the state of the art which check the overall outer housing with a high pressure. Thereby, the outer housing can be designed for a lower pressure in the second pressure region, the middle pressure region and thus, for example, the wall thicknesses, the size of the outer housing or screw sizes can be reduced with respect to known sizes and designs.

In an embodiment of the invention the separation element is arranged in the outer housing such that the second pressure region is divided into a first and a second pressure chamber. The first and second pressure chamber are in this connection connected by means of a compensation line and the compensation line is arranged in the separation element.

The separation element can be arranged in the outer housing such, that the second pressure region is, for example, divided into a first and a second pressure chamber. The first pressure chamber can thus be bounded by the separation element, the first or second closure element and the outer housing. The second pressure chamber can thus be bounded by the separation element, the first or second closure element and the outer housing. The compensation line can, for example, be configured as a bore or more generally as a flow connection and can be arranged in the separation element. Due to the compensation line a pressure compensation between the first and the second pressure chamber is possible such that the middle pressure in both pressure chambers corresponds to the same pressure level.

In an embodiment of the invention the separation element includes a surrounding groove and the surrounding groove is arranged at the outlet of the outer housing.

The groove can, for example, be configured as a recess along a circumference of the separation element and in an axial direction of the outer housing can, for example, have a triangular, rectangular or different inner cross-section. The groove is arranged at the outlet such that a volume formed by means of the groove is a part of the first pressure region.

In an embodiment of the invention the separation element is connected to a shaft. The shaft is axially arranged in the outer housing and connected to the first and the second closure element.

A cylindrical or rod-shaped object is to be understood as a shaft, which, for example, can be configured as a rotor shaft in a pump. The separation element can, for example, have a cylindrical opening through which the shaft is guided. The separation element can, for example, be welded, screwed, taped or otherwise connected to the shaft. The shaft can, for example, be screwed at the axial ends to the first and/or the second closure element. A bore can be configured, for example, in the shaft and can be connected to the middle pressure line such that the second pressure region can be pressurized with pressure. In an embodiment of the invention the first pressure region and the second pressure region are separated from one another by means of a sealing element. The sealing element is arranged between separation element and the outer housing.

Since the first pressure region corresponds to a high pressure region and the second pressure region corresponds to a middle pressure region, a separation of the two regions by means of a sealing element is to be understood such that despite a pressure difference between the first and second pressure region quasi no pressure compensation takes place. The sealing element can be arranged between the separation element and the outer housing. The sealing element is configured as a seal, in particular as an O-ring from an elastomer material or of metal. It is also possible that, in particular, two or more sealing elements, in particular O-rings are arranged next to one another. The sealing element is arranged between or at the separation element and/or the outer housing, since these spatially bound the first and second pressure regions. In this connection, the sealing element can be arranged, for example, in a groove of the separation element or of the outer housing. The sealing element can also be configured as a different kind of seal, for example, in the shape of a metal seal, a flat seal, or a coating, for example, with an elastic material. On use of a sealing element, a particularly good separation and sealing of the first and second pressure region can be achieved.

In an embodiment of the invention the separation element is of two part design and a part of the separation element is connected to the first or second closure element.

The separation element is of two part design, this means that, for example, a part of the separation element can be arranged at the outer housing and the sealing element can be arranged between this part of the separation element and the outer housing. A part of the separation element can be connected to the first or the second closure element, for example by means of a connection element, in particular by means of a rod or a tube. The connection element is connected to a part of the separation element and to the first or the second closure element, this means it can, in particular be screwed. Thereby the first and/or the second closure element is/are loaded with the force of the middle pressure and an operating force, wherein the operating force images the forces arising through the high pressure in the operating state. It is of advantage that the real force conditions, for example, of a pump in the operating state can be totally imaged by means of this arrangement of the testing apparatus.

The invention further relates to a method for the testing of an outer housing of the pump, wherein the outer housing has an outlet and the testing apparatus includes a separation element, a first closure element and a second closure element, a middle pressure line, which is arranged in the first or second closure element and a bounding element, wherein a high pressure line is arranged in the bounding element.

In accordance with the invention a respective axial end of the outer housing is closed by means of the first and second closure element in a sealing manner. The separation element is configured and arranged at the outer housing such that the outlet of the outer housing is bounded and the outer housing is divided into a first pressure region and a second pressure region, wherein the first and the second pressure regions are pressurized with pressure subsequently or at the same time as pressure regions independent from one another and the pressure is measured in the first and the second pressure region.

The method can, for example, be carried out with the above-described testing apparatus.

In an embodiment of the invention a testing liquid is supplied and drawn away into the second pressure region by means of the middle pressure line and supplied and drawn away into the first pressure region by means of the high pressure line.

The testing liquid can be liquid or gaseous, in particular can be configured as air, water or a water mixture. The testing liquid can, for example, be guided by means of a feed unit, for example, a pump having a line or a tube at the testing apparatus and/or fill the first and second pressure chambers with the testing liquid. Moreover, it is, for example, possible to maintain a cycle for the testing liquid, for example, by means of the feed apparatus. The middle pressure line and the high pressure line can be connected to the feed unit in a flow conducting manner for this purpose.

In an embodiment of the invention the first pressure region is pressurized at a higher pressure than the second pressure region. Moreover, the separation element is arranged such in the outer housing that the second pressure region is divided into a first and a second pressure chamber, wherein in the first and the second pressure chamber a like pressure level is formed.

Figure 2:
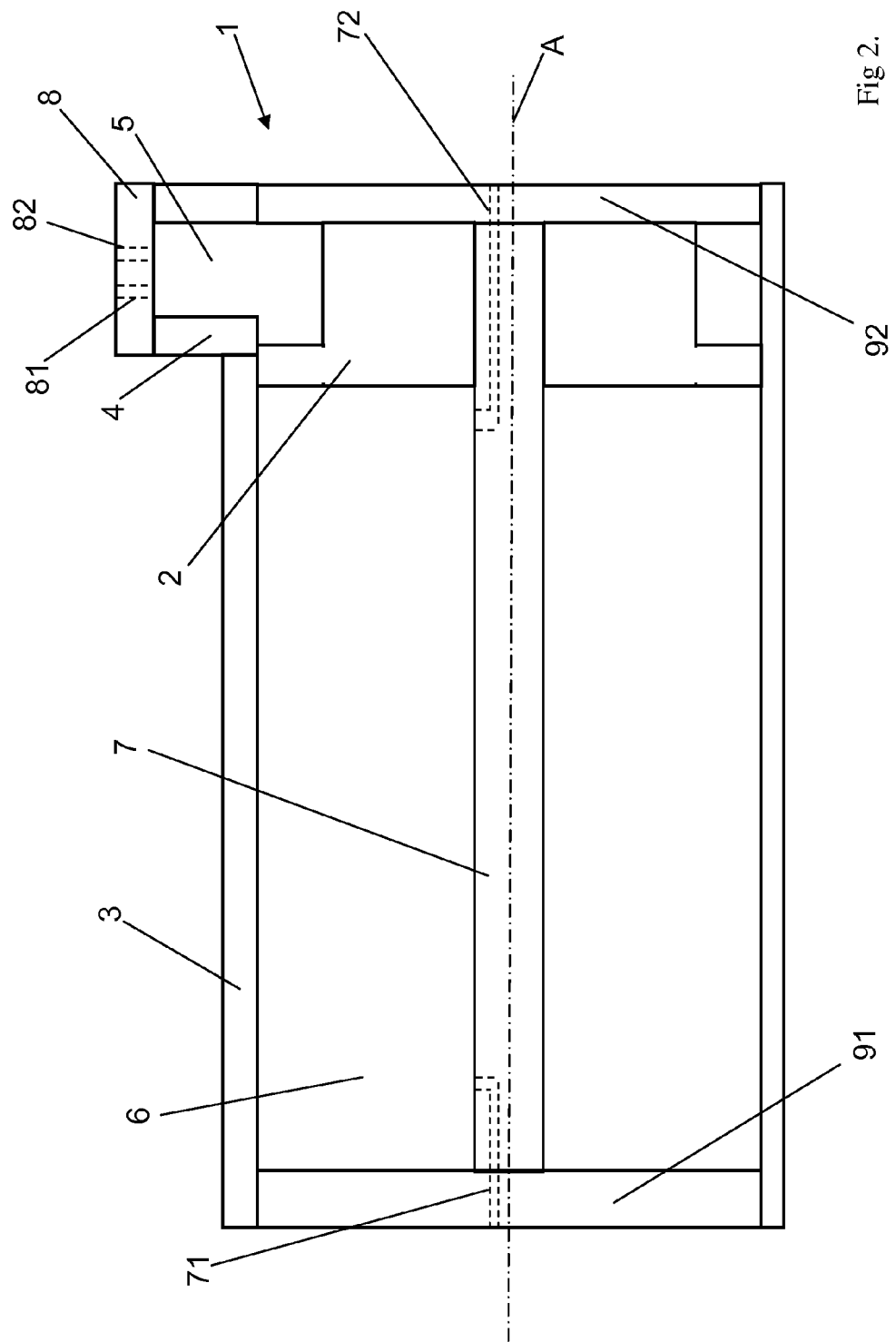

Further advantageous measures and preferred method steps result from the dependent claims. In the following the apparatus will be described in detail both from an apparatus point of view and also from a process engineering point of view by means of embodiments with reference to the drawing. In the schematic drawing there is shown:

FIG. 1 a first embodiment of the testing apparatus;
FIG. 2 a second embodiment of the testing apparatus.

FIG. 1 has a testing apparatus 1 and an outer housing 3 configured as a housing of a pump having an outlet 4 of the outer housing 3. The outer housing 3 is substantially configured as a hollow cylindrical or tubular housing. The testing apparatus 1 includes a separation element 2, a first and a second closure element 91, 92, a middle pressure line 71, 72 and a bounding element 8. The first and second closure elements 91, 92 respectively close an axial end of the outer housing 3 in a sealing manner. The middle pressure lines 71, 72 are arranged in the first and second closure element 91, 92, wherein, as illustrated in FIG. 1, a testing liquid is supplied by means of a middle pressure line 71 and is drawn away or vented by means of a further middle pressure line 72.

The bounding element 8 closes the outlet 4 outside of the outer housing 3 in a sealing manner. A high pressure line 81, 82 is arranged in the bounding element 8, wherein, as illustrated in FIG. 1, a testing liquid is supplied by means of a high pressure line 81 and is drawn away or vented by means of a further high pressure line 82.

The separation element 2 is configured as a cylindrical separation element 2 and an inner diameter of the separation element 2 corresponds to an inner diameter of the outer housing 3. The separation element 2 is arranged in the outer housing 3 and at the outlet 4, such that the separation element 2, the bounding element 8 and the outer housing 3 bound a first pressure region 5. The first pressure region 5 is configured as a high pressure region. Moreover, the separation element 2 includes a circumferential groove which is arranged at the outlet 4 of the outer housing 3 and whose volume is configured as a part of the first pressure region 5.

Due to the arrangement of the separation element 2, the separation element 2, the outer housing 3 and the first and/or the second closure element 91, 92 bound a second pressure region 6, wherein no flow connection is present between the first pressure region 5 and the second pressure region 6 and thus no pressure compensation is possible. The second pressure region 6 is configured as a middle pressure region. Since the separation element 2 divides the second pressure region 6 into a first and a second pressure chamber 61, 62 a compensation line 21 is arranged in the separation element 2 such that a pressure level in the first and second pressure chamber 61, 62 equalizes.

The separation element 2 is connected to a shaft 7 by means of a fastening element, for example, is welded, or screwed by means of a screw (not illustrated). The shaft 7 is in turn connected to the first and the second closure element 91, 92, for example, by means of a screw (not illustrated). The separation element 2 is of two part design and a part 22 of the separation element is connected to the first or the second closure element 91, 92 by means of a connection element 23. The connection element 23 is in turn connected to a part 22 of the separation element and the first or the second closure element 91, 92 by means of a fastening element (not illustrated), for example, screws.

The shaft 7 is arranged along the axis A in an axial direction. Moreover, the one middle pressure line 71 is arranged in the first closure element 91 and the shaft 7 and a further middle pressure line 72 is arranged in the second closure element 92 and the shaft 7. In this connection, the one middle pressure line 71 is flow-connected to the first pressure chamber 61 and the further middle pressure line 72 is flow-connected to the second pressure chamber 62.

A separation or a sealing of the first pressure region 5, of the second pressure region 6 and of a low pressure region lying outside the outer housing 3 by means of a sealing element is described in the following is, however, not illustrated in FIG. 1. A separation of the first pressure region 5, the second pressure region 6 and of the low pressure region is to be understood such that no or only a marginal pressure compensation takes place between the pressure regions. The first pressure region 5 and the second pressure region 6 are separated from one another by means of a sealing element (not illustrated). The separation element 2 is closed by the outer housing 3 and a contact is present between an outer sealing surface of the separation element 2 and an inner sealing surface of the outer housing 3.

Likewise the second pressure region 6 and the low pressure region are separated from one another. The first closure element 91 is closed by the outer housing and a contact is present between an outer sealing surface of the first closure element 91 and an inner sealing surface of the outer housing 3. In contrast to this the second closure element 92 closes the outer housing 3 and a contact is present between an outer sealing surface of the outer housing 3 and an inner sealing surface of the second closure element 92. The first and the second closure elements 91, 92 can in this respect also be arranged in an inverse manner.

The outer and/or inner sealing surface of the separation element 2, of the outer housing 3, of the bounding element 8 and of the first and the second closure elements 91, 92 have a recess, for example, a groove (not illustrated) in which an O-ring (not illustrated) of an elastomer material is arranged. A second O-ring can also be arranged in parallel to this O-ring.

In the following a method for testing an outer housing 3 of a pump will be presented by means of FIG. 1. The flow of a testing liquid into the testing apparatus 1 is illustrated by arrows, wherein the arrows are not associated with a reference numeral. The method is transferable to all further testing apparatuses 1 in accordance with the invention.

The separation element 2 is configured and arranged in the outer housing 3 such that the outlet 4 of the outer housing 3 is bounded and the outer housing 3 is divided into a first pressure region 5 and a second pressure region 6. The first pressure region 5 and the second pressure region 6 are pressurized with pressure subsequently or at the same time as pressure regions separate from one another.

The first pressure region 5 is pressurized with pressure by means of a high pressure line 81, 82. The pressure in the first pressure region 5 corresponds to the highest pressure in the overall testing apparatus 1. Prior to a testing it is initially vented, in that the supply line 81 and the extraction line 82 are both opened. Subsequently, the testing liquid is guided into the first pressure region by means of the supply line 81 and simultaneously drawn away via the outlet line 82 such that a closed cycle arises. A testing of the high pressure region takes place at a pressure which is larger, in particular corresponds to 1.5 times the pressure for which the outer housing 3 is designed. A further possibility of carrying out the method following the venting is to pressurize the first pressure region 5 with pressure by means of the high pressure line 81, 82 at a desired testing pressure, to close the high pressure line 81, 82 and at the end of the testing time to reduce the pressure again, in that the supply line 81 and/or the outlet line 82 are opened. By means of the method the outer housing 3 is tested with respect to strength, seal tightness and strain release.

The second pressure region 6 is pressurized with a pressure by means of the middle pressure line 71, 72. The second pressure region 6 is pressurized with a smaller pressure than the first pressure region 5, in particular approximately half of the pressure of the first pressure region 5. If the second pressure region 6 is pressurized with pressure and if the testing fluid is introduced into the first pressure chamber 61 by means of the middle pressure line 71, 72, then a pressure compensation takes place between the first pressure chamber 61 and the second pressure chamber 62 by means of the compensation line 21. Furthermore, on the testing of the second pressure region 6, the same method steps are carried out like for the testing of the first pressure region 5. During the carrying out of the method the pressures in the first pressure region 5 and the second pressure region 6 are measured.

FIG. 2 shows a second embodiment of the testing apparatus 1 in accordance with the invention, wherein FIG. 2 substantially corresponds to FIG. 1. In this second embodiment the outlet 4 of the outer housing 3 is present at an axial end of the outer housing 3. The separation element 2 thus does not divide the outer housing 3 into a first and a second pressure chamber 61, 62 so that no compensation line 21 is present. A first pressure region 5 is bounded by the bounding element 8, the outer housing 3, the first or the second closure element 91, 92 and the separation element 2. The second pressure region 6 is bounded by the separation element 2, the outer housing 3 and the first or the second closure element 91, 92. The method in accordance with the invention is carried out with the already described steps.

The invention claimed is:

1. A testing apparatus for an outer housing (3) of a pump, wherein the outer housing (3) has an outlet (4), and the testing apparatus (1) includes
   a separation element (2);
   a first and a second closure element (91, 92), wherein the first and second closure elements (91, 92) respectively close an axial end of the outer housing (3) in a sealing manner;
   a middle pressure line (71, 72) which is arranged in the first or the second closure element (91, 92); and
   a bounding element (8), wherein the bounding element (8) closes the outlet (4) outside of the outer housing (3) and wherein a high pressure line (81, 82) is arranged in the bounding element (8), and
   the separation element (2) is configured and arranged in the outer housing (3) such that the separation element (2) bounds the outlet (4) of the outer housing (3) and the outer housing (3) is divided into a first pressure region (5) and a second pressure region (6), wherein the first pressure region (5) and the second pressure region (6) are configured as pressure regions independent from one another.

2. A testing apparatus in accordance with claim 1, wherein the separation element (2) is arranged in the outer housing (3) such that the second pressure region (6) is divided into a first pressure chamber (61) and a second pressure chamber (62).

3. A testing apparatus in accordance with claim 2, wherein the first and second pressure chambers (61, 62) are connected by means of a compensation line (21).

4. A testing apparatus in accordance with claim 3, wherein the compensation line (21) is arranged in the separation element (2).

5. A testing apparatus in accordance with claim 1, wherein the separation element (2) includes a circumferential groove and the circumferential groove is arranged at the outlet (4) of the outer housing (3).

6. A testing apparatus in accordance with claim 1, wherein the separation element (2) is connected to a shaft (7).

7. A testing apparatus in accordance with claim 6, wherein the shaft (7) is axially arranged in the outer housing (3) and is connected to the first and second closure elements (91, 92).

8. A testing apparatus in accordance with claim 1, wherein the first pressure region (5) and the second pressure region (6) are separated from one another by means of the sealing element.

9. A testing apparatus in accordance with claim 1, wherein the sealing element is arranged between the separation element (2) and the outer housing (3).

10. A testing apparatus in accordance with claim 1, wherein the separation element (2) is of two part design and a part (22) of the separation element is connected to the first or the second closure element (91, 92).

11. A method for testing an outer housing (3) of a pump, wherein the outer housing (3) has an outlet (4),
   and the testing apparatus (1) includes a
   separation element (2);
   a first closure element (91) and a second closure element (92);
   a middle pressure line (71, 72) which is arranged in the first or the second closure element (91, 92);
   a bounding element (8), wherein a high pressure line (81, 82) is arranged in the bounding element (8), and wherein an axial end of the outer housing (3) is respectively closed in a sealing manner by means of the first and second closure elements (91, 92), wherein the separation element (2) is configured and arranged in the outer housing (3) such that the outlet (4) of the outer housing (3) is bounded and the outer housing (3) is divided into a first pressure region (5) and a second pressure region (6), wherein the first pressure region (5) and the second pressure region (6) are subsequently or simultaneously acted on by pressure as pressure regions independent of one another and the pressure is measured in the first pressure region (5) and the second pressure region (6).

12. A method in accordance with claim 11, wherein a testing fluid is supplied and conducted away into the second pressure region (6) by means of the middle pressure line (71, 72) and is supplied and conducted away into the first pressure region (5) by means of the high pressure line (81, 82).

13. A method in accordance with claim 11, wherein the first pressure region (5) is pressurized with a higher pressure than the second pressure region (6).

14. A method in accordance with claim 1, wherein the separation element (2) is arranged in the outer housing (3) such that the second pressure region (6) is divided into a first pressure chamber (61) and a second pressure chamber (62).

15. A method in accordance with claim 14, wherein a common pressure level is formed in the first and second pressure chambers (61, 62).

\* \* \* \* \*